US011378687B2

(12) United States Patent
Koyama et al.

(10) Patent No.: US 11,378,687 B2
(45) Date of Patent: Jul. 5, 2022

(54) DISTANCE MEASUREMENT APPARATUS AND DISTANCE MEASUREMENT METHOD

(71) Applicant: SONY CORPORATION, Tokyo (JP)

(72) Inventors: Takahiro Koyama, Kanagawa (JP); Toyoharu Oohata, Tokyo (JP); Tomoki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 874 days.

(21) Appl. No.: 16/089,210

(22) PCT Filed: Jan. 31, 2017

(86) PCT No.: PCT/JP2017/003266
§ 371 (c)(1),
(2) Date: Sep. 27, 2018

(87) PCT Pub. No.: WO2017/175458
PCT Pub. Date: Oct. 12, 2017

(65) Prior Publication Data
US 2019/0129032 A1 May 2, 2019

(30) Foreign Application Priority Data

Apr. 5, 2016 (JP) .............................. JP2016-076056

(51) Int. Cl.
*G01S 17/10* (2020.01)
*G01S 7/4865* (2020.01)
(Continued)

(52) U.S. Cl.
CPC ................. *G01S 17/10* (2013.01); *G01C 3/06* (2013.01); *G01S 7/4818* (2013.01);
(Continued)

(58) Field of Classification Search
CPC ........... G01C 3/06; G01C 3/08; G01S 7/4818; G01S 7/4861; G01S 7/4863; G01S 7/4865; G01S 7/4873; G01S 17/08; G01S 17/06
See application file for complete search history.

(56) References Cited

U.S. PATENT DOCUMENTS 5,805,527 A * 9/1998 Hoashi .................... G01S 15/00
367/99
2008/0304843 A1* 12/2008 Kosuge .................. G03G 15/02
399/50
(Continued)

FOREIGN PATENT DOCUMENTS

| CN | 101273282 A | 9/2008 |
| EP | 1942354 A1 | 7/2008 |

(Continued)

OTHER PUBLICATIONS

International Search Report and Written Opinion of PCT Application No. PCT/JP2017/003266, dated May 16, 2017, 12 pages of ISRWO.

*Primary Examiner* — Hovhannes Baghdasaryan
(74) *Attorney, Agent, or Firm* — Chip Law Group

(57) ABSTRACT

A distance measurement apparatus including at least one measurement unit, in which the measurement unit includes: a voltage level converter that applies an arbitrary bias to a voltage obtained on the basis of an output from a light receiver to offset a level of the voltage; an amplifier that amplifies a voltage output from the voltage level converter; and a measurement section that measures a timing at which an output from the amplifier reaches a predetermined threshold.

10 Claims, 10 Drawing Sheets

(51) Int. Cl.
*G01C 3/06* (2006.01)
*G01S 7/4861* (2020.01)
*G01S 7/487* (2006.01)
*G01S 7/481* (2006.01)

(52) U.S. Cl.
CPC .......... *G01S 7/4861* (2013.01); *G01S 7/4865* (2013.01); *G01S 7/4873* (2013.01)

(56) References Cited

U.S. PATENT DOCUMENTS

| | | | |
|---|---|---|---|
| 2009/0046272 A1* | 2/2009 | Ohishi | G01C 3/08 356/5.01 |
| 2009/0268193 A1* | 10/2009 | Ohishi | G01C 3/08 356/5.01 |

FOREIGN PATENT DOCUMENTS

| | | |
|---|---|---|
| JP | 61-135222 A | 6/1986 |
| JP | 05-223928 A | 9/1993 |
| JP | 2007-078424 A | 3/2007 |
| JP | 2007-093210 A | 4/2007 |
| JP | 2007-147332 A | 6/2007 |
| JP | 2014-081254 A | 5/2014 |
| WO | 2007/034635 A1 | 3/2007 |

* cited by examiner

DISTANCE MEASUREMENT APPARATUS AND DISTANCE MEASUREMENT METHOD

CROSS REFERENCE TO RELATED APPLICATIONS

This application is a U.S. National Phase of International Patent Application No. PCT/JP2017/003266 filed on Jan. 31, 2017, which claims priority benefit of Japanese Patent Application No. JP 2016-076056 filed in the Japan Patent Office on Apr. 5, 2016. Each of the above-referenced applications is hereby incorporated herein by reference in its entirety.

TECHNICAL FIELD

The present technology relates to a distance measurement apparatus and a distance measurement method.

BACKGROUND ART

Conventionally, there is known a distance measurement apparatus that measures a distance to a measurement target (for example, refer to Patent Documents 1 and 2 below).

CITATION LIST

Patent Document

Patent Document 1: Japanese Patent Application Laid-Open No. 2007-078424

Patent Document 2: Japanese Patent Application Laid-Open No. 2007-147332

SUMMARY OF THE INVENTION

Problems to be Solved by the Invention

As a method for controlling the detection level of reflected light, a method of controlling the sensitivity of a light receiver that receives reflected light is proposed in Patent Document 1. This method, however, has a problem that increasing sensitivity also amplifies intrinsic dark current noise, leading to degradation of the signal-to-noise ratio (S/N) of an obtained signal, causing distance measurement accuracy deterioration and false detection. Furthermore, even when the sensitivity is lowered, there is also a problem of degradation of S/N due to a decrease in the signal level. On the other hand, while a technique described in Patent Document 2 enhances distance measurement accuracy with a plurality of different reflected light detection methods in accordance with the intensity of the reflected light, this method also has a problem of complication of the configuration of the system (apparatus).

In view of these, one of the objects of the present invention is to provide a distance measurement apparatus and a distance measurement method capable of enhancing the accuracy of distance measurement without complicating the system.

Solutions to Problems

In order to solve the above problem, the present technology is a distance measurement apparatus including, for example, at least one measurement unit,
in which the measurement unit includes:
a voltage level converter that applies an arbitrary bias to a voltage obtained on the basis of an output from a light receiver so as to offset a level of the voltage;
an amplifier that amplifies a voltage output from the voltage level converter; and
a measurement section that measures a timing at which an output from the amplifier reaches a predetermined threshold.

Furthermore, the present technology, is, for example, a distance measurement method on a distance measurement apparatus configured to:
apply, by a voltage level converter, an arbitrary bias to a voltage obtained on the basis of an output from a light receiver so as to offset a level of the voltage;
amplify, by an amplifier, a voltage output from the voltage level converter; and
measure, by a measurement section, a timing at which an output from the amplifier reaches a predetermined threshold.

Effects of the Invention

According to at least one embodiment of the present technology, it is possible to enhance distance measurement accuracy. Note that the effects described herein are not necessarily limited, and any effect described in the present technology may be utilized. Furthermore, content of the present technology are not to be construed as limiting by the exemplified effects.

MODE FOR CARRYING OUT THE INVENTION

Embodiments of the present technology or the like will be described below with reference to the drawings. Note that the description is given in the following order.
<1. First Embodiment>
<2. Second Embodiment>
<3. Modification>

The embodiments or the like described below are preferred specific examples of the present technology, and the content of the present technology is not limited to these embodiments or the like.

1. First Embodiment

"Time of Flight (TOF) Method"

Figure 1:
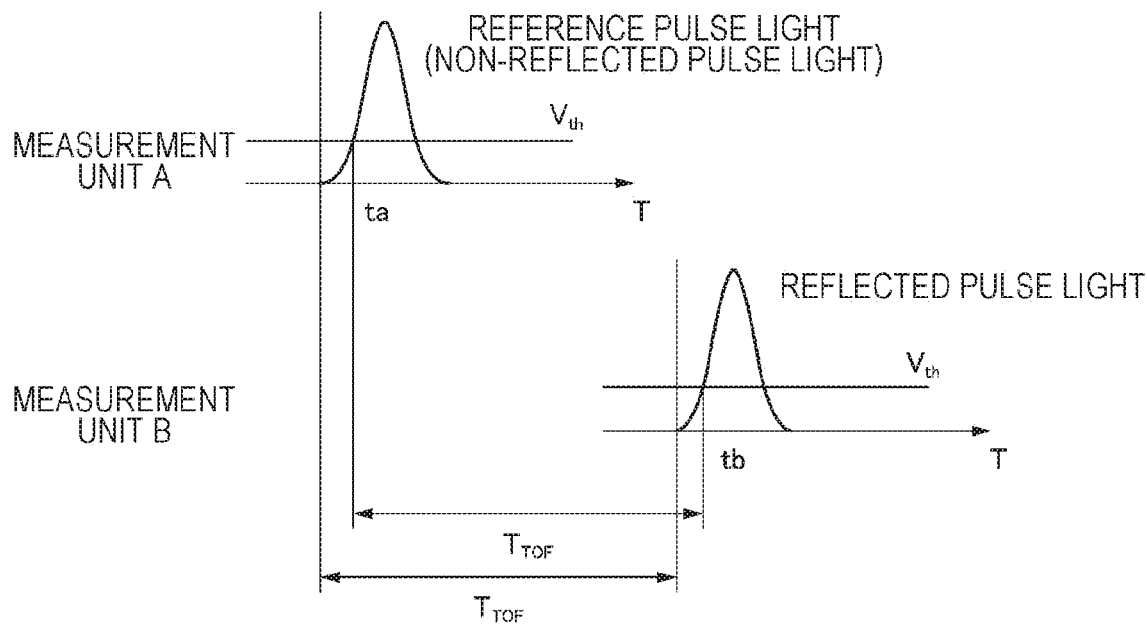
FIG. 1 is a diagram for illustrating a TOF method that is one type of distance measurement.

In order to facilitate understanding of the present technology, a TOF method as one method of distance measurement will be schematically described with reference to FIG. 1. The TOF method emits reference pulse light to an object of distance measurement, namely, a measurement target, so as to measure a time of flight $T_{TOF}$ necessary until the reception of the reflected pulse light.

As an example, time of flight $T_{TOF}$ is measured as follows. Reference pulse light (non-reflected pulse light) is received by a light receiver A, and a timing to when a signal (voltage) output from the light receiver A exceeds a threshold $V_{th}$ is detected by a measurement unit A. Meanwhile, reflected pulse light, that is, the reference pulse light reflected from the measurement target is received by a light receiver B, and a timing tb when a signal (voltage) output from the light receiver B exceeds the threshold $V_{th}$ is detected by a measurement unit B. It is possible to measure the time of flight $T_{TOF}$ by measuring a difference between the timing to and the timing tb. Then, the distance to the distance measurement target can be calculated by multiplying the time of flight $T_{TOF}$ by a light velocity c (m/s) and then, multiplying the multiplication result by ½.

Meanwhile, actual distance measurements include a case where the distance to the measurement target is long and a case where the reflectivity of the measurement target is low. In such a case, light intensity of the reflected pulse light may decrease leading to difficulty in measuring the timing at which the level of the reflected pulse light exceeds the threshold $V_{th}$. In order to handle reception of weak light with reduced light intensity of reflected pulse light, it is necessary to lower the level of the threshold $V_{th}$ or to increase the amplification factor of the signal. However, when the level of the threshold $V_{th}$ is lowered, reception of the reflected pulse light having high light intensity may detect a tail of a rising edge of a pulse signal obtained by the light reception, leading to deterioration of distance measurement accuracy. Moreover, since a tail of a rising edge of a pulse signal includes noise, or the like, leading to higher sensitivity to disturbance noise such as electric noise and ambient light and this may induce erroneous detection. Such a problem may occur similarly when the amplification factor is increased.

Figure 2:
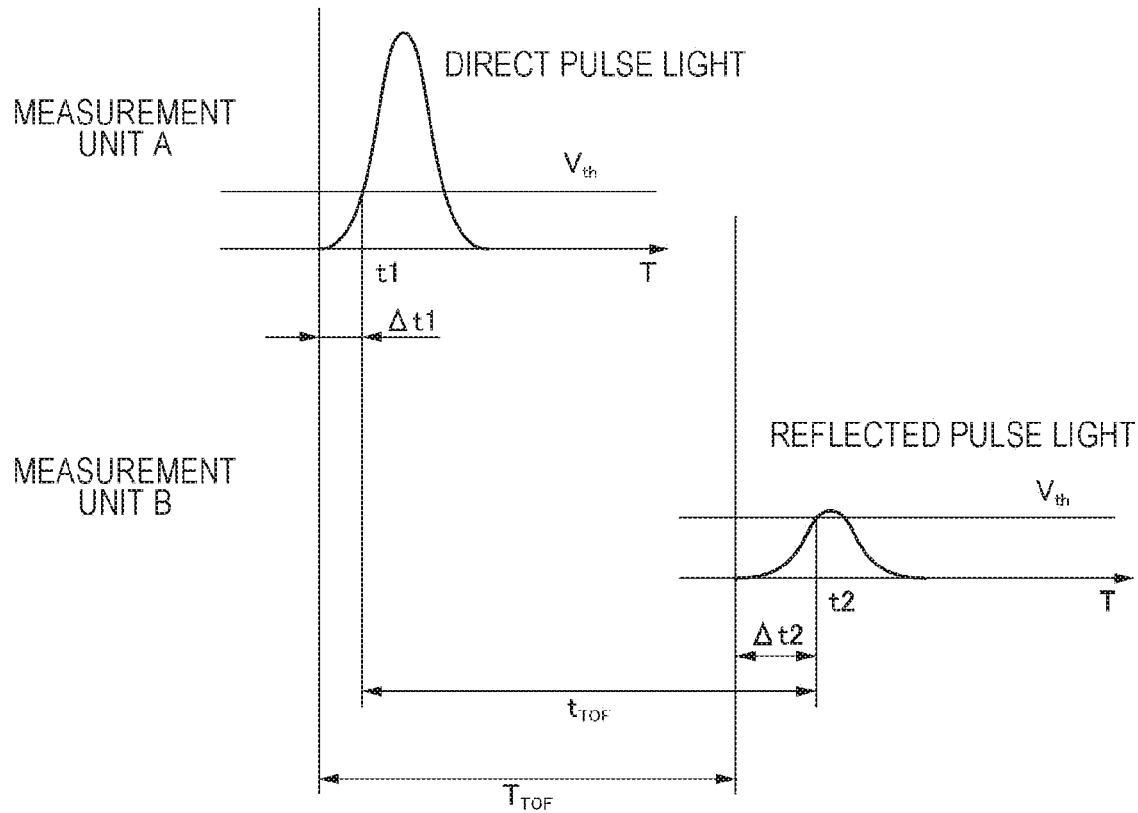
FIG. 2 is a diagram for illustrating a walk error.

Furthermore, the transmission signal obtained by receiving reflected pulse light is not a perfect triangle wave, and a change amount in voltage with respect to time may be small near the rising edge of the signal and near the top of the pulse. In this case, as illustrated in FIG. 2, time t2 at which the voltage pulse reaches the determined threshold $V_{th}$ varies depending on the reflected pulse light intensity. In this case, the obtained time of flight $T_{TOF}$ is different from the true time of flight $T_{TOF}$ by Δt2-Δt1, and it is necessary to correct this deviation amount (walk error) in order to obtain high distance resolution. An embodiment or the like of the present technology made in view of the above points will be described in detail.

"Configuration Example of Distance Measurement Apparatus"

Figure 3:
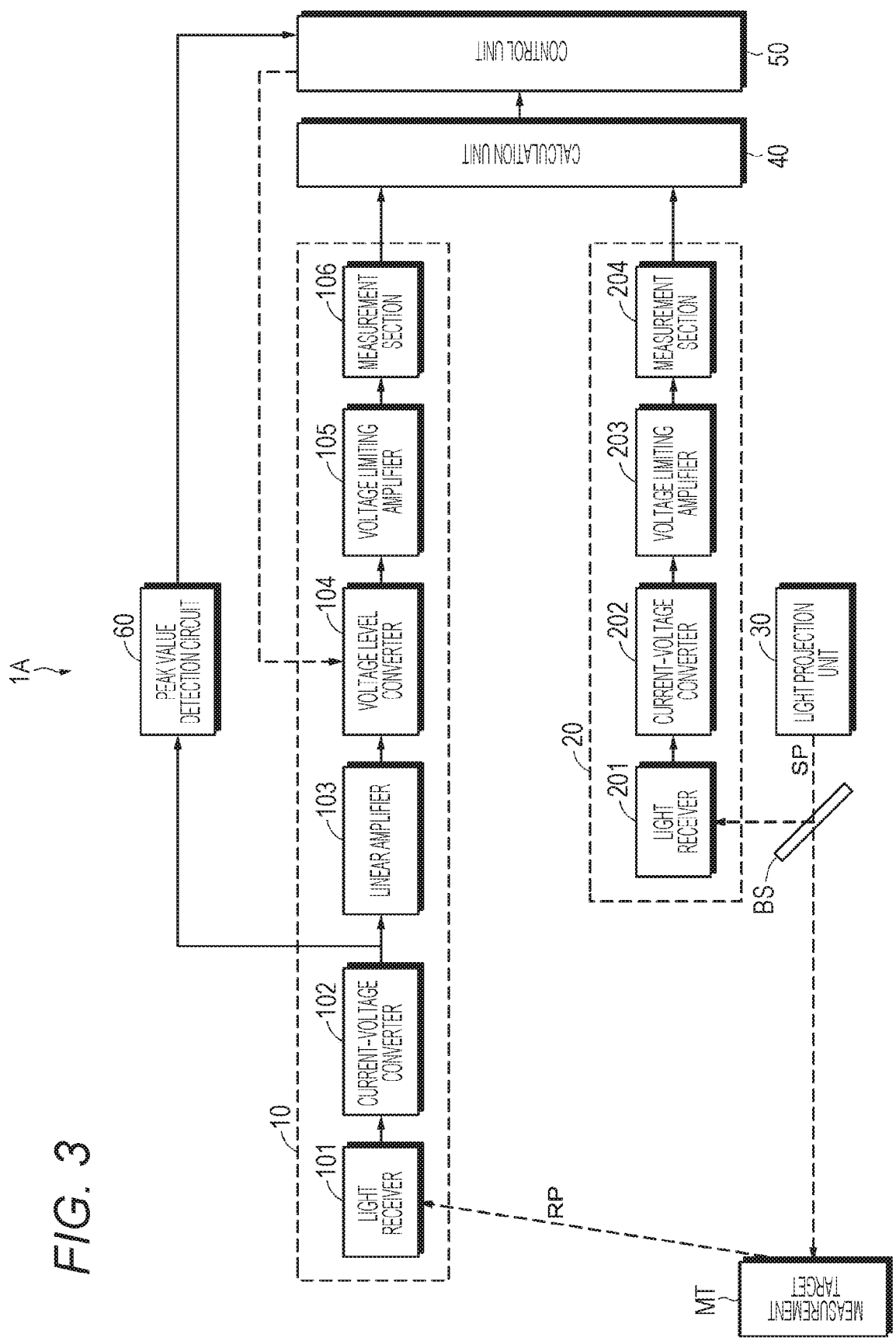
FIG. 3 is a diagram for illustrating a configuration example of a distance measurement apparatus according to a first embodiment of the present technology.

FIG. 3 is a diagram illustrating a configuration example of a distance measurement apparatus (distance measurement apparatus 1A) according to the first embodiment of the present technology. The distance measurement apparatus 1A is a distance measurement apparatus to which the above-described TOF method is applied as an example, and includes, for example, a first measurement unit 10, a second measurement unit 20 as another measurement unit, a light projection unit 30, a calculation unit 40, a control unit 50, and a peak value detection circuit 60.

Individual portions of the distance measurement apparatus 1A will be described in detail. The first measurement unit 10 includes, for example, a light receiver 101, a current-voltage converter 102, a linear amplifier 103, a voltage level converter 104, a voltage limiting amplifier 105, and a measurement section 106.

The light receiver 101 includes, for example, a plurality of photon counting light receiving elements connected in parallel. In the present embodiment, a single photon avalanche photodiode (SPAD) (hereinafter referred to as SPAD as appropriate) is used as the photon counting light receiving element. The light receiver 101 receives reflected pulse light RP, which is reflection of reference pulse light SP emitted from the light projection unit 30 on a measurement target MT.

The current-voltage converter 102 is an element or a circuit that converts a current output from the light receiver 101 into a voltage. The current-voltage converter 102 in the present embodiment is constituted with a (load) resistor connected between the light receiver 101 and the ground (GND).

The linear amplifier 103 is a circuit that linearly amplifies the voltage output from the current-voltage converter 102 with a predetermined amplification factor.

The voltage level converter 104 is configured to apply an arbitrary bias to a voltage obtained on the basis of an output from the light receiver 101 so as to offset a level of the voltage. Note that a specific configuration example or the like of the voltage level converter 104 will be described below.

The voltage limiting amplifier 105 is a circuit that amplifies an output voltage and outputs the amplified voltage. As will be described in detail below, the voltage limiting amplifier 105 in the present embodiment is configured as a limiting amplifier that outputs a predetermined limit value in a case where the amplified voltage exceeds a predetermined limit value.

The measurement section 106 detects an edge point at which the voltage output from the voltage limiting amplifier 105 reaches the predetermined threshold $V_{th}$ so as to measure a light reception timing, and outputs the measured light reception timing to the calculation unit 40. The measurement section 106 in the present embodiment is configured with a time-digital converter (TDC) (hereinafter referred to as TDC as appropriate) that converts the measured timing into a digital value and outputs the obtained digital value. Note that although it will be described in detail below, the measurement section 106 measures a timing at which the level-offset signal reaches 0V from a minus level, for example. This offset value corresponds to the threshold $V_{th}$.

The second measurement unit 20 includes, for example, a light receiver 201, a current-voltage converter 202, a voltage limiting amplifier 203, and a measurement section 204.

The light receiver 201 includes, for example, a plurality of photon counting light receiving elements connected in parallel. The present embodiment uses an SPAD as the photon counting light receiving element. The light receiver 201 receives the reference pulse light SP emitted from the light projection unit 30 and branched by a beam splitter BS. Note that the configuration of the light receiver 201 and the light receiving element to be used may be different from the case of the light receiver 101.

The current-voltage converter 202 is an element or a circuit that converts a current output from the light receiver 201 into a voltage. The current-voltage converter 202 in the present embodiment is constituted with a (load) resistor connected between the light receiver 201 and the ground.

The voltage limiting amplifier 203 is a circuit that amplifies the output voltage and outputs the amplified voltage. The voltage limiting amplifier 203 in the present embodiment is configured as a limiting amplifier that outputs a predetermined limit value in a case where the amplified voltage exceeds the predetermined limit value.

The measurement section 204 detects an edge point at which the voltage output from the voltage limiting amplifier 203 reaches the predetermined threshold $V_{th}$ so as to measure the light reception timing, and outputs the measured light reception timing to the calculation unit 40. The measurement section 204 in the present embodiment is configured with TDC that converts the measured timing into a digital value and outputs the obtained digital value.

The light projection unit 30 includes, for example, a pulse laser diode and a driver to drive the pulse laser diode (not illustrated) as a light source. Operation of the driver causes pulsed light to be emitted from the pulse laser diode. As an example, the light projection unit 30 emits pulsed light having a wavelength of about 830 nanometers (nm) and a half width of 300 picoseconds (ps) or less with repetition of 10 megahertz (MHz). The light source wavelength of the light projection unit 30 selects a wavelength contained in the sunlight as ambient light in a small proportion, still, wavelength other than 830 nm is allowable. Furthermore, the half width of the laser is desirably smaller than the half width at the rising edge of a SPAD signal.

The calculation unit 40 is constituted with a microcomputer, a field programmable gate array (FPGA), or the like. The calculation unit 40 calculates the time of flight $T_{TOF}$ of the pulse light by obtaining a difference between the light reception timing of the reflected pulse light RP measured by the measurement section 106 and the light reception timing of the reference pulse light SP measured by the measurement section 204. The calculation unit 40 multiplies the time of flight $T_{TOF}$ by the light velocity c and then multiplies the result by ½ so as to calculate the distance to the measurement target MT.

The control unit 50 is constituted with a microcomputer, an FPGA, or the like, and controls individual portions of the distance measurement apparatus 1A. The control unit 50 executes, for example, control or the like including changing the threshold $V_{th}$ used in processing in the measurement section 106 and the measurement section 204, or setting a bias amount of bias applied by the voltage level converter 104 in accordance with a peak value detected by the peak value detection circuit 60.

The peak value detection circuit 60 is a circuit that detects a peak value (peak level) of the voltage output from the current-voltage converter 102 and outputs a detection result to the control unit 50. Examples of the peak value detection circuit 60 include circuits including an integration circuit and a flash type analog-to-digital (AD) converter.

"Light Receiver"

Figure 4:
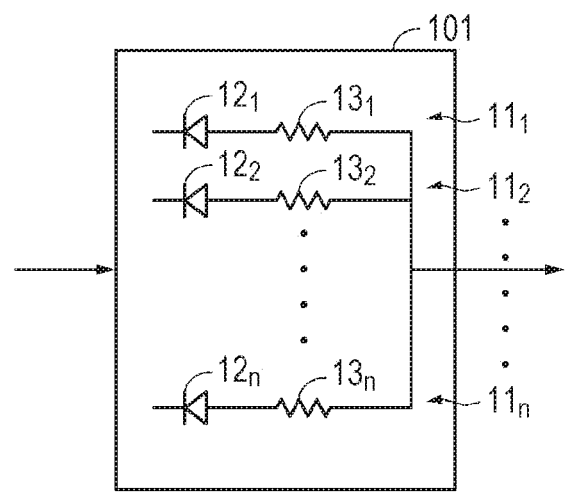
FIG. 4 is a diagram for describing an example of a light receiver according to an embodiment of the present technology.

Next, the light receiver 101 in an embodiment of the present technology will be described in detail. FIG. 4 is a diagram illustrating a configuration example of the light receiver 101. The light receiver 101 has a configuration in which a plurality of SPAD $11_1$, SPAD $11_2$, ... SPAD $11_n$ (n is an arbitrary integer) is connected in parallel (note that the SPAD is simply referred to as SPAD 11 in the following description when it is not necessary to distinguish between the individual SPADs). The SPAD 11 includes: an avalanche photodiode (APD) 12 to be operated under a reverse bias of a breakdown voltage or more (referred to as Geiger mode); and a quenching resistor 13 connected to the APD 12.

The APD 12 in the SPAD 11 generates an avalanche multiplication when it receives a single photon, and then generates an avalanche current with a multiplication factor of $10^5$ to $10^6$. The avalanche multiplication can be stopped by lowering the voltage applied to the APD 12 to the breakdown voltage or less. This function is implemented in the quenching resistor 13. That is, when an avalanche current flows through the quenching resistor 13, a voltage is generated across the quenching resistor 13, whereby the applied voltage to the APD 12 drops to stop avalanche multiplication. With the above mechanism, the SPAD signal becomes an exponentially decreasing current pulse.

During the avalanche multiplication of a predetermined period, the APD 12 does not react to reception of another photon. A dead period would be generally several nanoseconds (ns). In other words, the photon counting light receiving element is defined as an element including an element (for example, APD 12) that does not react to reception of another photon within a predetermined period after receiving a single photon and an element discriminated to have received one photon by its output.

Meanwhile, examples of noise signals generated from the SPAD 11 include a dark count and an after-pulse. The dark count is a pulse signal generated by a thermally excited carrier, and the after-pulse is a pulse signal generated by emission of a carrier captured by crystal defects or the like in the process of avalanche multiplication.

In a case where the light receiver 101 is constituted with a single SAPD 11, it is difficult to distinguish between the noise signal and the reflected pulse light RP (or reference pulse light SP), leading to failure in obtaining high S/N. Therefore, according to an embodiment of the present technology, the light receiver 101 is configured as a multi-pixel form connecting a plurality of SPADs 11 in parallel. This makes it possible to simultaneously receive photons by the number of SPADs 11 connected in parallel, leading to superimposed output of signals from the individual SPADs 11. Accordingly, it is possible to distinguish between the signal output from the light receiver 101 and accidentally generated noise signal. Furthermore, it is possible to obtain a signal with high S/N, and possible to receive reflected pulse light RP with low intensity.

Figure 5:
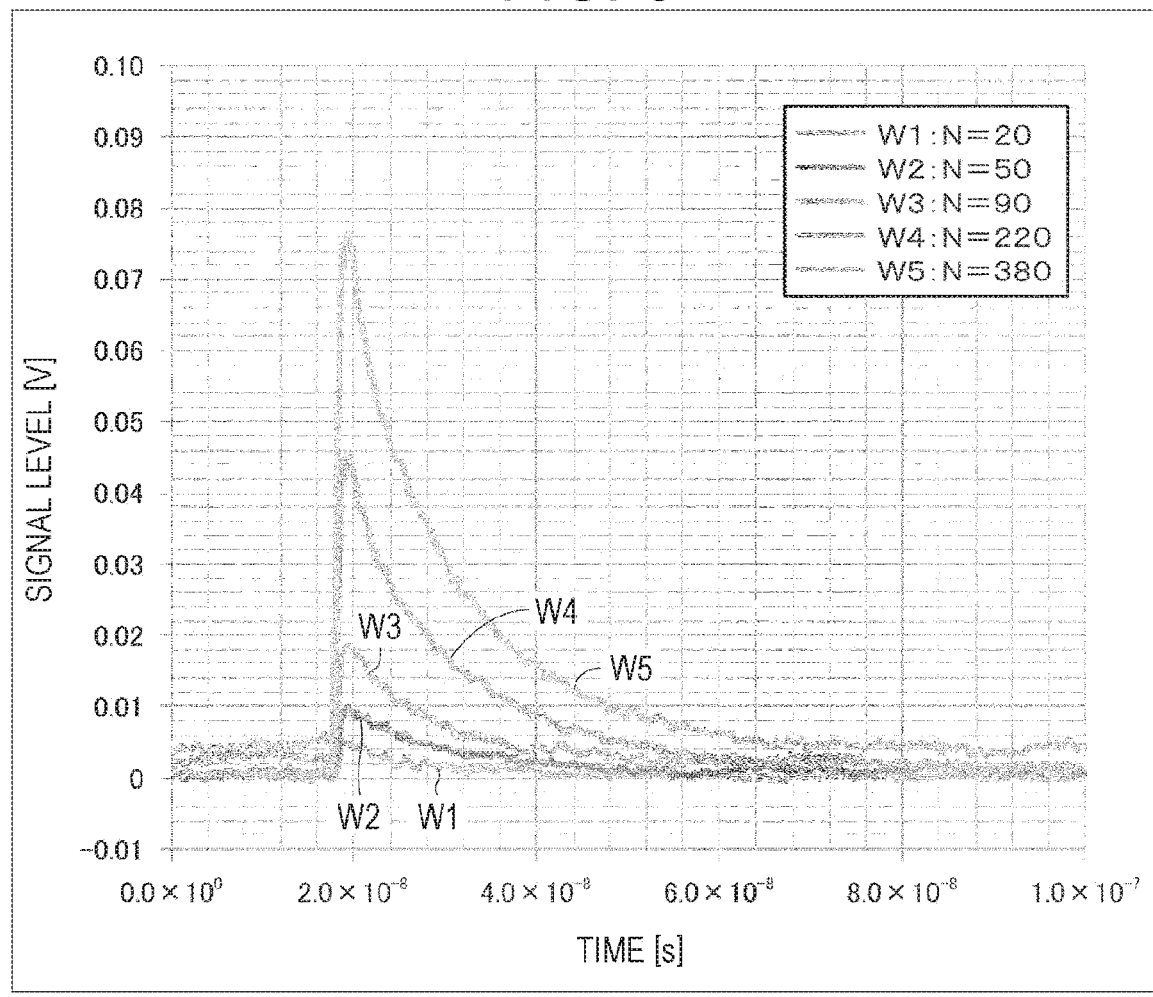
FIG. 5 is a diagram illustrating an example of an output signal from a light receiver according to an embodiment of the present technology.

FIG. 5 illustrates a waveform example of a voltage signal generated across the current-voltage converter 102 from a current signal output from the light receiver 101 applied through the current-voltage converter 102 (for example, a resistor of 50Ω (ohm)). Note that the current signal output from the light receiver 101 is a combination of the current signals output from the individual SPADs 11.

In FIG. 5, the vertical axis represents signal level (voltage) and the horizontal axis represents time. Note that this example uses, as the light receiver 101, the SPADs 11 being arranged 120 elements horizontally and 120 elements vertically in parallel (namely, 120×120) each having an external dimension of about 3 mm² (spacing between SPAD 11 (pitch) being 25 micrometer (μm)). The dynamic range of the receivable reflected pulse light corresponds to the maximum number of SPADs. Since the 14,400 SPADs 11 are connected in parallel in the present example, it is possible to receive photons of 1 to 14,400, with the dynamic range of four digits or more.

In FIG. 5, a waveform W1 illustrates a waveform of an output signal when the light receiver 101 receives 20 photons, a waveform W2 illustrates a waveform of the output signal when the light receiver 101 receives 50 photons, a waveform W3 illustrates a waveform of the output signal when the light receiver 101 receives 90 photons, a waveform W4 illustrates a waveform of the output signal when the light receiver 101 receives 220 photons, and a waveform W5 illustrates a waveform of the output signal when the light receiver 101 receives 380 photons.

In general, when a plurality of SPADs 11 is used as the light receiver 101, it is conceivable that the timing at which each of the SPADs 11 receives photons varies with each other and the output signal from the SPAD 11 is separated into a plurality of signals. However, with the half width of the pulsed light emitted from the light projection unit 30 reduced to be sufficiently smaller than that at a rising time of the SPAD signal, the signal output from the light receiver 101 is not separated and can be handled as a waveform attenuates exponentially, as illustrated in FIG. 5.

The rising time of the output signal from the light receiver 101 is about 1 ns while the falling time when the signal level becomes 1/e (e is logarithmic)) is about 20 ns, with no observation of a waveform change due to the increase in the number of received photons. The peak value (peak level) of the output signal from the light receiver 101 increases together with an increase in the number of photons received, with the signal level per photon being about 0.2 millivolts (mV). Significant amplification of the noise level is not observed and a signal with improved S/N can be obtained by increased number of received photons.

Simultaneous reception of a large number of photons by the a plurality of SPADs 11 can not merely improve the S/N but also reduce variations in the light reception time (hereinafter referred to as SPAD jitter as appropriate) attributed to the SPAD 11. This point will be described in detail.

When samples of size N are extracted from the population of mean value m and standard deviation σ with an assumption of a population with a normal distribution, an average value m' and a standard deviation σ' are given by m'=m, and σ'=σ/√N, respectively. Here, when a jitter specific to the SPAD 11 is σ_SPAD, an effective SPAD jitter at simultaneous reception of N photons is given by σ_SPAD/√N, indicating the more the number N of photons increases, the more the effective SPAD jitter can be reduced. That is, SPAD jitter can be kept within a range of statistical error with increased the number of photons N received using the plurality of SPADs 11. In other words, it is possible to make the SPAD jitter at reception of light by the plurality of SPADs 11 lower than the SPAD jitter at reception of light by each of the SPADs 11. In this manner, since the light receiver 101 is configured with the a plurality of SPADs 11, it is possible to reduce the jitter in the light receiver 101, and possible to prevent deterioration in accuracy of distance measurement due to the influence of jitter.

As illustrated in FIG. 5, a convergence time taken by the output signal from the light receiver 101 to converge is 60 ns to 80 ns, enabling handling the repetition frequency 10 MHz of the pulsed light from the light projection unit 30 (100 ns in terms of cycle). The convergence time is determined by a time constant of a circuit including the SPAD 11, or the like, and mainly depends on a total parasitic capacitance of a plurality of SPADs 11 constituting the light receiver 101. The convergence time can be shortened by narrowing the pitch between SPADs 11 or by decreasing the number of SPADs 11, making it possible to handle distance measurement with higher repetition speed as well. In other words, the number of SPADs 11, the arrangement form, or the like are not limited to those exemplified and can be arbitrarily set in consideration of the application of the distance measurement apparatus 1A, the intensity of the reflected pulse light RP, or the like.

"Voltage Level Converter and Voltage Limiting Amplifier"

Next, the voltage level converter 104 and the voltage limiting amplifier 105 in the embodiment of the present technology will be described in detail. For convenience of explanation, the voltage limiting amplifier 105 will be described first. Note that the voltage limiting amplifier 203 is also configured similarly to the voltage limiting amplifier 105 in the present embodiment, description below can also be applied to the voltage limiting amplifier 203.

As described above, with a configuration of the light receiver 101 using the plurality of SPADs 11 in the present embodiment, it is possible to achieve the dynamic range of the output signal of, for example, four digits or more. However, when the output signal is linearly amplified over the entire dynamic range, the signal may exceed an input standard of a digital circuit used in the measurement section 106 in a subsequent stage. Therefore, it is desirable that the voltage limiting amplifier 105 be an amplifier that amplifies a signal of a weak level and that limits an output within the standard in a case where the amplified value exceeds the input standard ($V_{lim}$) of the digital circuit in the measurement section 106.

It is possible to use a limiting amplifier as such an amplifier, for example. The limiting amplifier is a high-speed, high-gain amplifier optimized for applications of Gigabit Ethernet (GbE) and optical fiber channel optical receivers, implemented by an integrated circuit (IC) chip that amplifies input signals with different signal amplitudes to differential signal outputs with a fixed amplitude and then performs waveform shaping on the signal. Advantage of using the limiting amplifier includes: limiting the output exceeding a fixed value while amplifying the input signal with a uniform differential gain thereby obtaining a rated output regardless of an input signal level, canceling a noise component by using differential transmission signals so as to implement signal transmission with high S/N, and capability of transmitting a radio frequency signal such as the output signal of the SPAD 11 rising at about 1 ns without dulling the signal.

With application of a limiting amplifier as the voltage limiting amplifier 105, for example, it is possible to configure the light receiver 101 by a plurality of SPADs 11 in order to achieve a wide dynamic range of a signal, while suppressing the inconveniences due to adoption of the configuration. Note that hereinafter, amplification operation of the limiting amplifier will be referred to as "limiting amplification" in some cases.

When a plurality of SPADs 11 is used as the light receiver 101, an output signal from the light receiver 101 is a single-ended signal, leading to an input of one channel to the voltage limiting amplifier 105. Even in this case, however, a differential output can be obtained.

Figure 6:
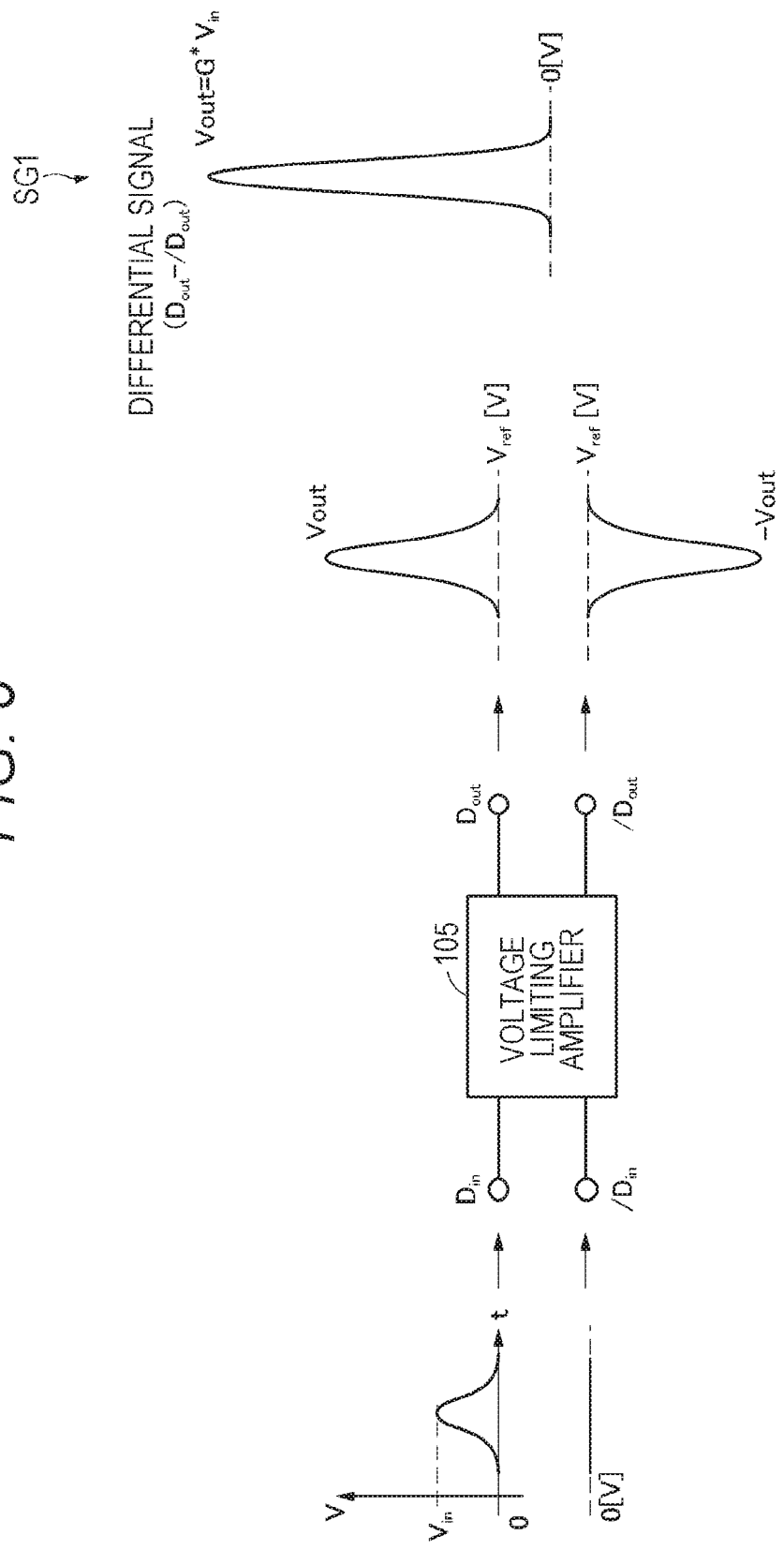
FIG. 6 is a diagram for illustrating an operation example of a voltage limiting amplifier according to an embodiment of the present technology.

FIG. 6 is a diagram for illustrating an example of output when an output signal from the light receiver 101 is input to the voltage limiting amplifier 105 with one channel. For the purpose of clarity of description, FIG. 6 illustrates the output signal from the light receiver 101 in a simplified form with a pulse waveform. The input terminals (Din and /Din) of the voltage limiting amplifier 105 are biased to a common voltage ($V_{ref}$) conforming to the signal standard. Here, a single-ended signal (output signal from the light receiver 101) having a common voltage of 0V is input to the Din terminal. In contrast, the /Din terminal has no input.

In the case of the input described above, a signal having a profile that swings to a positive voltage using $V_{ref}$ [V] as a common voltage is output from an output terminal Dout of the voltage limiting amplifier 105, while a signal having a profile that swings to a negative voltage using $V_{ref}$ [V] as a common voltage is output from an output terminal /Dout. When a signal amplitudes at the input/output terminals are V_Din, V_/Din, and V_Dout, V_/Dout and the differential gain of the voltage limiting amplifier 105 is G, the amplitude of the voltage at this time is given by the following Formula (1).

$$V\_Dout-V/Dout=G*(V\_Din-V\_/Din) \quad (1)$$

That is, the differential gain G is an amplification factor with respect to the amplitude of the differential signal. Note that as described above, in a case where the amplitude of the input signal is large and the output of the voltage limiting amplifier 105 exceeds $V_{lim}$, the amplitude is limited.

Figure 7:
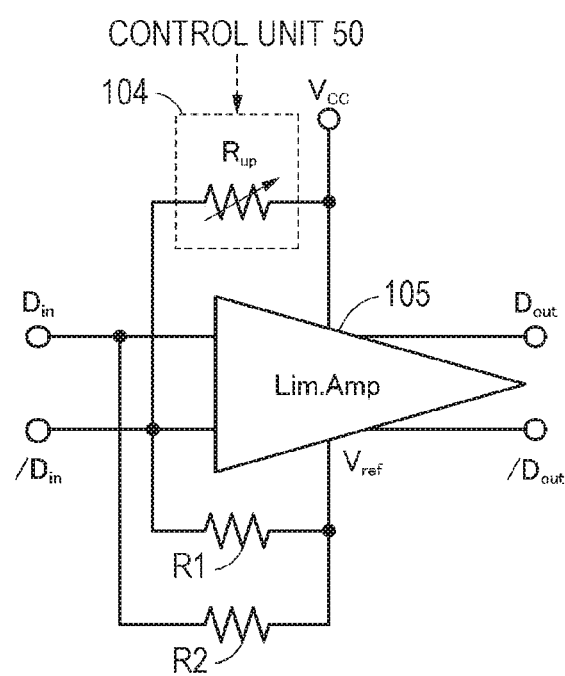
FIG. 7 is a diagram for illustrating a configuration example of a voltage level converter and a voltage limiting amplifier according to an embodiment of the present technology.

In the case of the differential output signal illustrated in FIG. 6, however, there is no negative offset, making it difficult to obtain a timing at which the output signal reaches 0V. Therefore, in the present embodiment, the voltage level converter 104 is provided to offset the level of the output signal from the linear amplifier 103 to measure the timing at which the output signal reaches 0V. FIG. 7 is a diagram illustrating a configuration example of the voltage level converter 104 and the voltage limiting amplifier 105 in an embodiment of the present technology. As described above, the voltage limiting amplifier 105 is configured as a limiting amplifier (Lim. Amp) of two inputs and two outputs, for example. A power supply voltage $V_{cc}$ (for example, 3.3V) is supplied from a power supply section (not illustrated) to the voltage limiting amplifier 105. As described above, the input terminals (Din and /Din) of the voltage limiting amplifier 105 are biased to the common voltage ($V_{ref}$) that conforms to a signal standard via resistors R1 and R2, respectively. Note that resistors R1 and R2 are 50Ω resistors used for impedance matching, for example, and are not necessarily connected.

The power supply voltage $V_{cc}$ and the input terminal /Din are connected with each other via a variable resistor $R_{up}$. The variable resistor $R_{up}$ corresponds to the voltage level converter 104 in the present embodiment. The resistance value of the variable resistor $R_{up}$ is controlled by the control unit 50, for example. A variable voltage $V_{up}$ based on the power supply voltage $V_{cc}$ can be generated by controlling the resistance value of the variable resistor $R_{up}$, enabling application of a bias of an arbitrary bias amount to the input terminal /Din by the voltage $V_{up}$.

Figure 8:
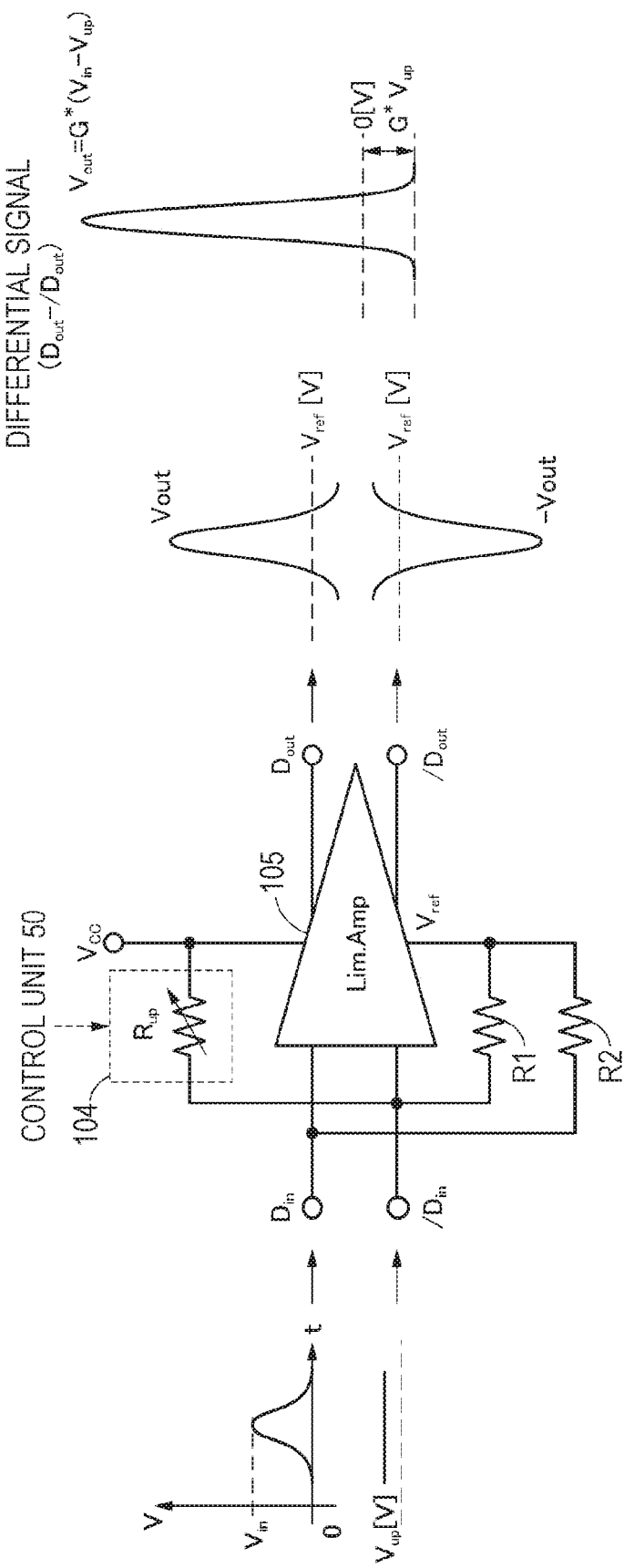
FIG. 8 is a diagram for illustrating an operation example of a voltage level converter and a voltage limiting amplifier according to an embodiment of the present technology.

The example illustrated in FIG. 6 is a case where the single-ended signal is input to the input terminal Din, with no input at the input terminal /Din. In the present example, however, the input terminal /Din is biased by the voltage $V_{up}$, leading to an input being $V_{ref}+V_{up}$ [V]. This processing is equivalent to inputting a direct current (DC) of the voltage $V_{up}$ to the input terminal /Din. As illustrated in FIG. 8, the input signal is amplified and output in accordance with the above Formula (1) also in this case. However, the differential output is offset (shift) by $G*V_{up}$ to negative voltage by biasing the input terminal /Din by the voltage $V_{up}$. The measurement section 106 measures a timing at which the level of the differential signal reaches 0V from the threshold $V_{t}h$, that is, $G*V_{up}$ which is the offset value.

For example, in a case where the level of the reflected pulse light RP is low, the resistance value of the variable resistor $R_{up}$ which is the bias amount may be increased to reduce the voltage $V_{up}$. In other words, the threshold $V_{th}$ can be reduced corresponding to the low level of the reflected pulse light RP. In contrast, in a case where the level of the reflected pulse light RP is high, the resistance value of the variable resistor $R_{up}$ which is the bias amount may be decreased to increase the voltage $V_{up}$. In other words, the threshold $V_{th}$ can be increased corresponding to the high level of the reflected pulse light RP, making it possible to prevent a situation such as the tail of the rising edge of the pulse signal is detected. With this control, it is possible to avoid the above-described inconvenience caused by level variation of the reflected pulse light RP.

Execution of this control needs detection of the level of the reflected pulse light RP. Therefore, the distance measurement apparatus 1A according to the present embodiment has a configuration in which an output of the current-voltage converter 102 is branched and input to the peak value detection circuit 60, and the peak value detection circuit 60 detects a peak value of the output signal from the light receiver 101. The peak value detection circuit 60 detects the peak value of the output signal from the light receiver 101 and supplies a detection result to the control unit 50. The control unit 50 identifies the level of the reflected pulse light RP on the basis of the peak value supplied from the peak value detection circuit 60 and controls the variable resistor $R_{up}$ so as to have a resistance value corresponding to the level. For example, the control unit 50 can be configured to have a look-up table listing the resistance value corresponding to the peak value (may be the number of photons), and can refer to the look-up table and set an appropriate resistance value as the variable resistor $R_{up}$.

Figure 9:
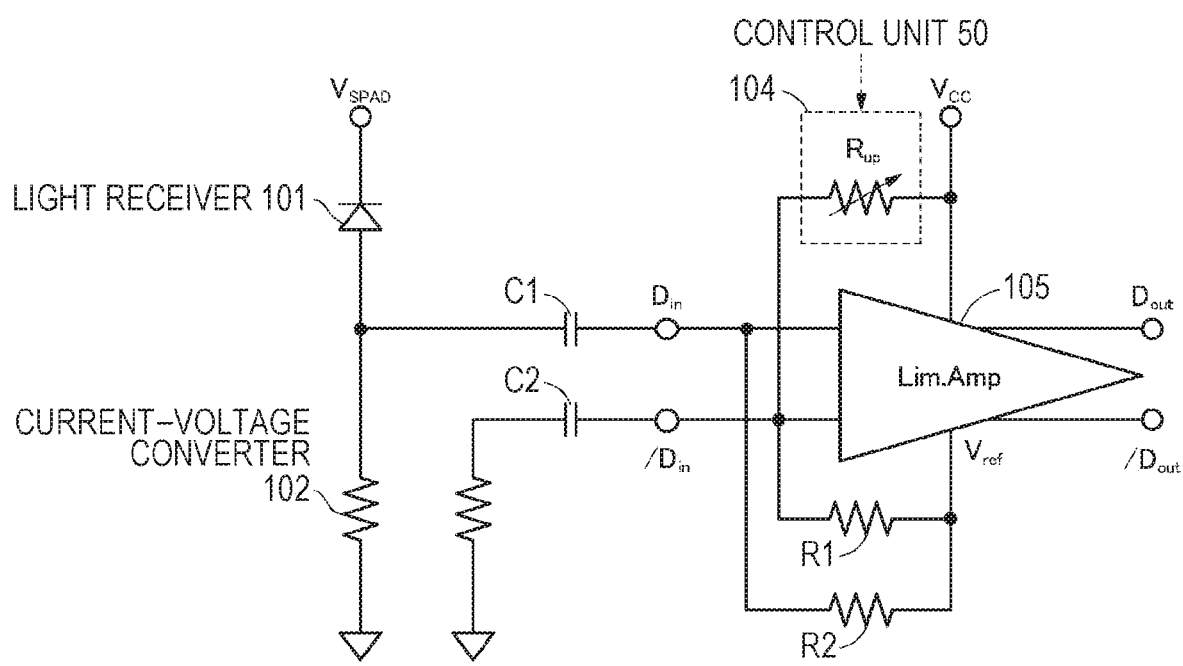
FIG. 9 is a diagram for illustrating a connection example between a voltage level converter and a voltage limiting amplifier, and a light receiver side, according to an embodiment of the present technology.

FIG. 9 is a diagram illustrating a connection example between the light receiver 101 side (specifically, the light receiver 101 and the current-voltage converter 102), with the voltage level converter 104 and with the voltage limiting amplifier 105. Note that illustration of the linear amplifier 103 is omitted in FIG. 9. When the light receiver 101 is DC-connected, a current flows in the current-voltage converter 102 due to the biased common voltage $V_{ref}$ at the input terminal Din. Therefore, this example has a configuration using alternating current (AC) connection between the light receiver 101 side and the voltage limiting amplifier 105 side via capacitors C1 and C2, selectively transmitting radio frequency signals output from the light receiver 101.

"Operation of Distance Measurement Apparatus"

Next, an operation example of the distance measurement apparatus 1A will be described. The driver of the light projection unit 30 operates to emit pulsed light from the light projection unit 30. A portion of the pulse light is reflected by the beam splitter BS and received by the light receiver 201 of the second measurement unit 20 as reference pulse light (non-reflected pulse light) SP. The light receiver 201 receives the reference pulse light SP, thereby outputting the current signal. Then, after the current signal is converted into a voltage signal in the current-voltage converter 202, the voltage signal is amplified in a limiting manner by the voltage limiting amplifier 203. The amplified voltage signal is output to the measurement section 204. The measurement section 204 measures a timing to at which a voltage of the amplified voltage signal reaches a predetermined threshold $V_{th}$ (for example, 0V), and generates a digital signal indicating the timing ta. The measurement section 204 outputs a digital signal indicating the timing ta to the calculation unit 40.

Meanwhile, a portion of the pulse light is reflected by a measurement target MT and received by the light receiver 101 of the first measurement unit 10 as reflected pulse light RP. The light receiver 101 receives the reflected pulse light RP, thereby outputting a current signal. Then, the current signal is converted into a voltage signal by the current-voltage converter 102. The converted voltage signal is branched and supplied to the peak value detection circuit 60. The peak value detection circuit 60 detects a peak value of the reflected pulse light RP and outputs a detection result to the control unit 50. The control unit 50 identifies a resistance value corresponding to the peak value and sets the resistance value to the variable resistor $R_{up}$ of the voltage level converter 104.

Meanwhile, the voltage signal output from the current-voltage converter 102 is supplied to the linear amplifier 103. The linear amplifier 103 amplifies the voltage signal with a predetermined amplification factor and outputs the amplified voltage to the voltage level converter 104. The voltage level converter 104 applies a bias of the bias amount set by the control unit 50 to the amplified voltage signal. Then, after the processing of amplifying the signal is performed in a limiting manner by the voltage limiting amplifier 105, the amplified voltage signal is output to the measurement section 106. The measurement section 106 measures a timing tb at which the voltage of the voltage signal supplied from the voltage limiting amplifier 105 reaches a predetermined threshold $V_{th}$ (for example, 0V), and generates a digital signal indicating the timing tb. The measurement section 106 outputs a digital signal indicating the timing tb to the calculation unit 40.

The calculation unit 40 calculates a difference (tb−ta) between the timing tb input from the measurement section 106 and the timing ta input from the measurement section 204. Then, the calculation unit 40 multiplies the difference (tb−ta) corresponding to the time of flight $T_{TOF}$ of the pulsed light by the light velocity c and then multiplies the result of the multiplication by ½ so as to calculate a distance to the measurement target MT. Information associated with the obtained distance to the measurement target MT is supplied to the control unit 50 in a subsequent stage and used in accordance with the application.

As described above, according to the first embodiment, a bias is applied to the signal obtained on the basis of the reflected pulse light, enabling the threshold for the signal level of the reflected pulse light to be changed relatively, rather than changing the threshold itself in the measurement section. As a result, an appropriate threshold is set for the signal level of the reflected pulse light, making it possible to prevent deterioration of distance measurement accuracy, and possible to resolve inconvenience caused by the light intensity of the reflected pulse light (walk error, or the like) to achieve higher distance measurement accuracy. Furthermore, since there is no need to provide a configuration related to a plurality of different detection methods, it is possible to prevent enlargement or complication of the apparatus.

2. Second Embodiment

Next, a second embodiment will be described. Note that the description in the first embodiment can also be applied to the second embodiment unless otherwise specified, and the same reference numerals are given to the same or similar components, and redundant description is omitted.

Figure 10:
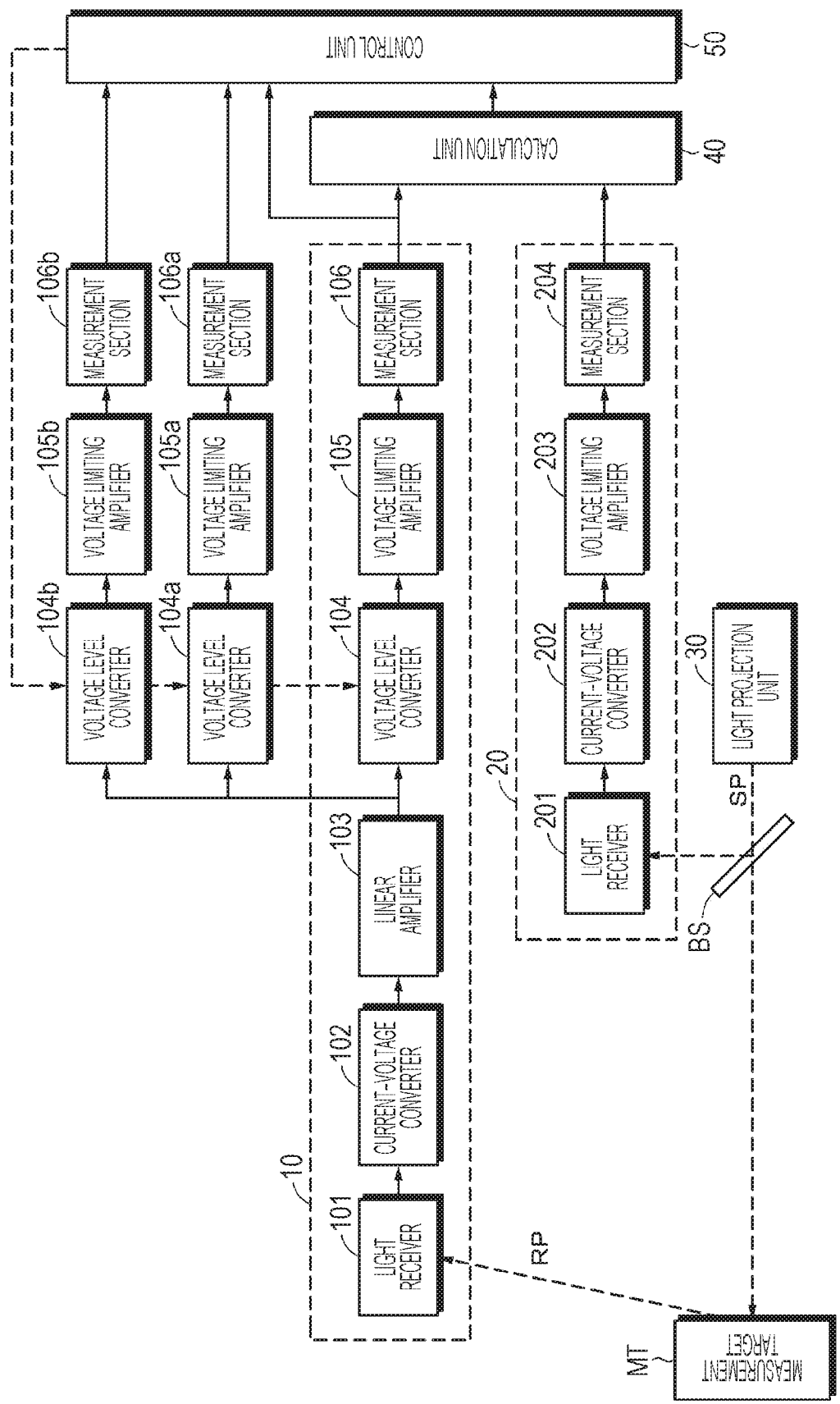
FIG. 10 is a diagram for illustrating a configuration example of a distance measurement apparatus according to a second embodiment of the present technology.

FIG. 10 illustrates a configuration example of the distance measurement apparatus (distance measurement apparatus 1B) according to the second embodiment. Instead of the peak value detection circuit 60, the distance measurement apparatus 1B includes a voltage level converter 104a, a voltage limit amplifier 105a, a measurement section 106a, a voltage level converter 104b, a voltage limiting amplifier 105b, a measurement section 106b. Note that these configurations have functions similar to the functions of the corresponding configurations (the voltage level converter 104, the voltage limiting amplifier 105, and the measurement section 106 in the first measurement unit 10). For each of the voltage level converters, a signal output from the linear amplifier 103 is branched and supplied. Note that different thresholds $V_{th1}$, $V_{th2}$, and $V_{th3}$ are set for the measurement sections 106, 106a, and 106b, respectively. Among them, the threshold $V_{th1}$ is the same as the threshold for calculating the time of flight $T_{TOF}$ of the reflected pulse light RP.

Figure 11:
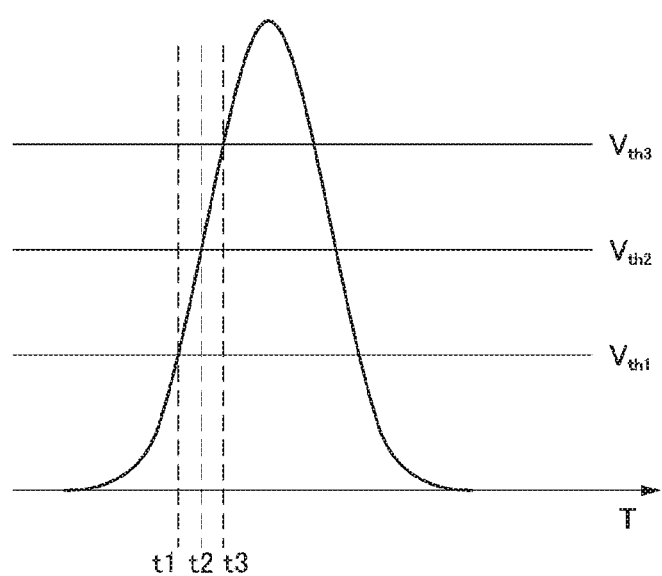
FIG. 11 is a diagram for illustrating an operation example of the distance measurement apparatus according to the second embodiment of the present technology.

The signal supplied from the linear amplifier 103 is branched and input to each of the measurement sections 106, 106a, and 106b. As schematically illustrated in FIG. 11, each of the measurement sections compares the level of the input signal with each of the thresholds $V_{th1}$, $V_{th2}$, and $V_{th3}$, respectively, and outputs a comparison result to the control unit 50. For example, each of the measurement sections outputs a logical high (H) level when the level of the signal is higher than a threshold, and outputs a logical low (L) level when the level of the signal is the threshold or less. The control unit 50 discriminates (estimates) the peak value of the signal (amplified signal) output from the light receiver 101 on the basis of the signal level output from each of the measurement sections. For example, the peak value may be discriminated on the basis of the largest threshold among the thresholds set in the measurement section that outputs the H level, or may be discriminated on the basis of a gradient (level change/time change (for example, (threshold $V_{th2}$−threshold $V_{th1}$)/(t2−t1))), the half width, or the like, in FIG. 11. The control unit 50 sets the bias amount corresponding to the discriminated peak value onto each of the voltage level converters. Since the other processing is similar to those in the first embodiment, duplicate description will be omitted.

Figure 12:
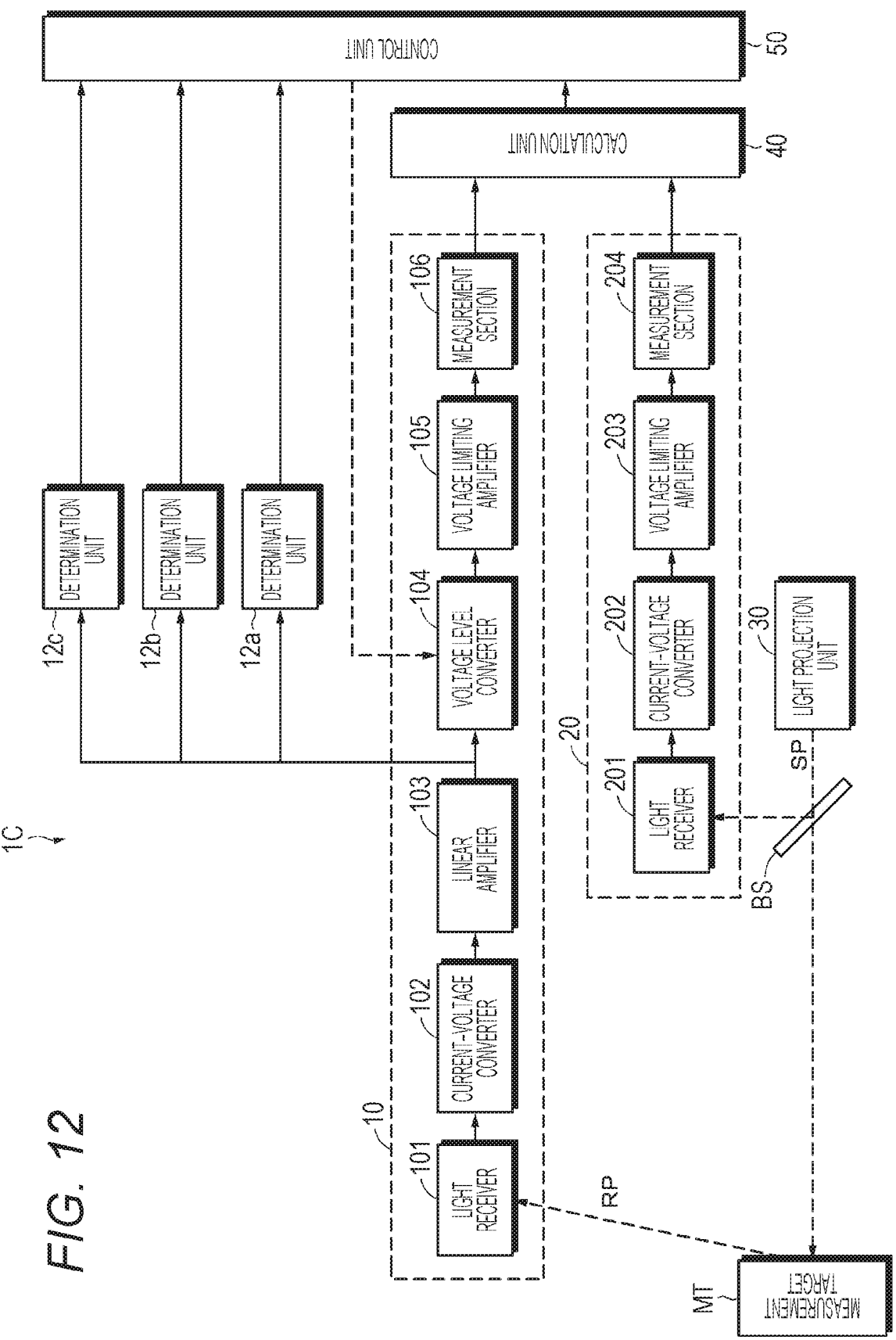
FIG. 12 is a diagram for illustrating another configuration example of the distance measurement apparatus according to the second embodiment of the present technology.

Note that the above-described configuration according to the second embodiment can be simplified. FIG. 12 illustrates a configuration example of another distance measurement apparatus (distance measurement apparatus 1C) according to the second embodiment. The distance measurement apparatus 1C includes three determination units (determination units 12a, 12b, and 12c) instead of the peak value detection circuit 60. Each of the determination units is constituted with a comparator or the like. The above-described thresholds $V_{th1}$, $V_{th2}$, and $V_{th3}$ are set in each of the determination units 12a, 12b, and 12c, respectively. Each of the determination units compares the level of the signal supplied from the linear amplifier 103 with each of the thresholds, and outputs a result in a logical level to the control unit 50. The control unit 50 discriminates the peak value on the basis of the signal level supplied from each of the determination units, and controls the voltage level converter 104 on the basis of the determination result to set an appropriate bias amount. Even with the configuration according to the second embodiment as described above, effects similar to those of the first embodiment can be obtained.

3. Modification

While the plurality of embodiments of the present technology has been specifically described above, the scope of the present technology is not limited to the above-described embodiments, and various modifications based on the technical concept of the present technology are possible.

In the above-described second embodiment, the thresholds $V_{th1}$, $V_{th2}$, and $V_{th3}$ respectively set in the measurement sections 106, 106a, and 106b may be the threshold $V_{th}$ described in the first embodiment. In this case, timings t1, t2, and t3 are obtained by processing of comparison by the measurement section 106 between the signal input from the linear amplifier 103 and each of thresholds. These timings t1, t2, and t3 are substantially equal, with jitter being superimposed on each of the values. Jitter can be reduced by executing jitter reduction processing such as averaging processing by the control unit 50 for each of these timings, enabling time-measurement with higher accuracy.

The above-described embodiment is an exemplary case where the light receiver 101 is constituted with SPADs. Since the level of the output signal of the SPAD is weak, the linear amplifier 103 is provided in consideration of a case having difficulty in achieving the signal level that can be measured by the measurement section 106 by amplification by the voltage limiting amplifier 105 alone. However, depending on the level of the output signal of the light receiver 101, the amplification factor of the voltage limiting amplifier 105, or the like, it is not always necessary to provide the linear amplifier 103. Still, in a case where the output signal from the light receiver 101 is branched as described in the second embodiment, it is preferable to provide the linear amplifier 103 in view of prevention of reduction of the signal level, or stabilization of the signal and prevention of oscillation of the circuit.

In a case where the distance to the measurement target MT is short or the reflectivity of the measurement target MT is high, the light intensity of the reflected pulse light RP may increase. In a case where a simultaneously amplified noise signal also exceeds the threshold $V_{th}$ on the measurement section 106, a plurality of timings to may be measured with respect to the timing tb. In such a case, the control unit 50 may perform processing of appropriately changing the threshold $V_{th}$ in the measurement section 106 on the basis of the output result from the calculation unit 40, specifically, by reducing the threshold $V_{th}$ in the measurement section 106 in a case where the timing ta has not been detected, and by increasing the threshold $V_{th}$ in the measurement section 106 in a case where the plurality of timings ta has been detected.

In the above-described second embodiment, the thresholds (thresholds $V_{th1}$, $V_{th2}$, and $V_{th3}$) set in each of the measurement sections (each of the determination units) may be dynamically changed, or the plurality of determination may be made. For example, it is allowable to first compare the level of the signal with the thresholds $V_{th1}$, $V_{th2}$, and $V_{th3}$, then set again the a plurality of thresholds being smaller than the maximum threshold among the thresholds determined to be higher than the signal level, and to compare the set thresholds with the signal levels again. In a case where the output signal from the light receiver 101 is a signal having continuous characteristics, the level of the reflected pulse light RP can be accurately discriminated by this configuration. Furthermore, the number of branches of signals and the configuration according to the number of branches in the second embodiment is not limited to the exemplified number and configuration and can be changed as appropriate.

The voltage level converter 104 is not limited to the variable resistor $R_{up}$. For example, the voltage level converter 104 may be a DC power supply (constant voltage source) that directly supplies the voltage $V_{up}$ as a bias to the input terminal /Din, and the configuration and method for applying the bias may be changed as appropriate.

The light receiver 101 and the light receiver 201 are not limited to the SPAD, and other light receiving elements can also be used. Furthermore, the number of SPADs used and the connection mode can be changed as appropriate. The quenching resistor 13 is not limited to a resistor and may be another circuit element such as a transistor.

The measurement section 106 is not limited to the TDC. For example, it is allowable to use a constant fraction discriminator (CFD) or the like to detect a zero-cross point (corresponding to the timing to or the like) by adding an attenuation waveform of a predetermined waveform and a waveform obtained by delay inverting the predetermined waveform. This also applies to the measurement section 204 in a similar manner.

In the distance measurement apparatus 1A or the like in the above embodiment, a delay circuit may be provided in a prior stage of the voltage level converter 104, or the like, with view of the time necessary for the process of detecting the peak value and the time necessary for the process of setting the resistance value of the variable resistor. Furthermore, the light projection unit 30 may be an apparatus different from the distance measurement apparatus 1A or the like. A half mirror or the like may be used instead of the beam splitter BS. The configuration of the distance measurement apparatus 1A or the like may be modified appropriately.

In the embodiment described above, the processing of applying a bias or the like is not to be performed onto the voltage obtained on the basis of the output from the light receiver 201 in consideration that variation of the level of the reference pulse light SP input to the light receiver 201 is small. However, the second measurement unit 20 may include a linear amplifier and a voltage level converter, that is, processing similar to that of the first measurement unit 10 may be performed on the second measurement unit 20.

The distance measurement apparatus 1A or the like may have one measurement unit. For example, it is allowable to have a configuration in which the reference pulse light SP and the reflected pulse light RP are input to one measurement unit. In this, the timing tb at which the reflected pulse light RP exceeds a predetermined threshold may be obtained while the timing to when the reference pulse light SP exceeds a predetermined threshold is stored, and the distance to the measurement target portion MT may be calculated on the basis of these timings.

In the above-described embodiment, an example in which a single-ended signal is input to the voltage level converter 104 has been described. However, the single-ended signal is not necessarily required, and a differential signal may be input, and a similar configuration can be applied in this case.

The distance measurement apparatus of the present technology may be incorporated not only as a single distance measurement device but may also be incorporated into various devices. For example, a distance measurement apparatus may be incorporated in a projector apparatus. Then, distance measurement may be performed for each of points on a wall surface as a projection surface, and irregularities of the wall surface may be identified. Correction processing (contrast improvement processing, color tone improvement processing, or the like) may be performed on the whole or a portion of the image data of the projected image according to the unevenness of the identified wall surface. Furthermore, the distance measurement apparatus of the present technology can also be applied to various electronic devices such as a game device and an imaging apparatus.

The distance measurement apparatus of the present technology can also be applied to a safety apparatus that detects a distance to a pedestrian, an obstacle, or the like and activates a brake in accordance with the distance. That is, the distance measurement apparatus of the present technology can also be applied to moving bodies such as automobiles, trains, airplanes, helicopters, and small air flying bodies in which such safety devices can be used. Furthermore, the distance measurement apparatus of the present technology can also be applied to robots (a customer robot, a disaster rescue robot, a cleaning robot, etc.) and a security device.

The configuration, methods, processes, forms, materials, numerical values, or the like, included in the above-described embodiments and modification examples are merely examples, and different configurations, methods, processes, forms, materials, numerical values or the like from those described are employable as needed. Furthermore, the present technology can be implemented by an apparatus, a method, a system including a plurality of apparatus, or the like, and the description in the embodiments and the modifications can be combined with each other unless technical inconsistency occurs.

Note that the present technology can also be configured as follows.

(1)

A distance measurement apparatus including at least one measurement unit, in which the measurement unit includes:

a voltage level converter that applies an arbitrary bias to a voltage obtained on the basis of an output from a light receiver to offset a level of the voltage;

an amplifier that amplifies a voltage output from the voltage level converter; and a measurement section that measures a timing at which an output from the amplifier reaches a predetermined threshold.

(2)

The distance measurement apparatus according to (1), in which the measurement unit includes a linear amplifier that amplifies an output from the light receiver.

(3)

The distance measurement apparatus according to (1) or (2), in which the amplifier outputs a predetermined limit value in a case where an amplified voltage exceeds a predetermined limit value.

(4)

The distance measurement apparatus according to any one of (1) to (3), further including:

the light receiver; and a converter that converts a current output from the light receiver into a voltage.

(5)

The distance measurement apparatus according to any one of (1) to (4), further including a calculation unit that calculates a distance to a measurement target using at least a timing measured by the measurement section.

(6)

The distance measurement apparatus according to any one of (1) to (5), further including a peak value detector that detects a peak value from a voltage obtained on the basis of an output from the light receiver, in which the applied bias amount is set in accordance with the peak value.

(7)

The distance measurement apparatus according to any one of (1) to (5), further including a plurality of determination units into which a voltage obtained on the basis of an output from the light receiver is branched and input and to which different thresholds are set, in which the applied bias amount is set in accordance with a result of comparison between the voltage and the threshold by the plurality of determination units.

(8)

The distance measurement apparatus according to any one of (1) to (7), including a plurality of the measurement units, in which a voltage obtained on the basis of an output from the light receiver is branched and input to each of the measurement units, and jitter reduction processing is executed using a timing measured by a measurement section in each of the measurement units.

(9)

The distance measurement apparatus according to any one of (1) to (8), including another measurement unit, in which the other measurement unit includes:

another amplifier that amplifies an output from another light receiver; and another measurement section that measures a timing at which an output from the other amplifier reaches a predetermined threshold.

(10)

The distance measurement apparatus according to (9), in which the light receiver receives reflected light that is projected from a light projection unit and reflected by a measurement target, and the other light receiver receives reference light projected from the light projection unit.

(11)

The distance measurement apparatus according to (10), further including the light projection unit.

(12)

The distance measurement apparatus according to any one of (9) to (11), further including a calculation unit that calculates a distance to the measurement target on the basis of a timing measured by the measurement section and the other measurement section.

(13)

A distance measurement method on a distance measurement apparatus configured to:

apply, by a voltage level converter, an arbitrary bias to a voltage obtained on the basis of an output from a light receiver so as to offset a level of the voltage;

amplify, by an amplifier, a voltage output from the voltage level converter; and measure, by a measurement section, a timing at which an output from the amplifier reaches a predetermined threshold.

REFERENCE SIGNS LIST 1A, 1B, 1C Distance measurement apparatus
10, 20 Measurement unit
12a, 12b, 12c Determination unit
30 Light projection unit
40 Calculation unit
50 Control unit
60 Peak value detection circuit
101, 201 Light receiver
103 Linear amplifier
104 Voltage level converter
105, 203 Voltage limiting amplifier
106, 204 Measurement section

The invention claimed is:

1. A distance measurement apparatus, comprising:
a first measurement unit that includes:
   a plurality of determination units, wherein each of the plurality of determination units is configured to receive a voltage that is associated with an output from a first light receiver, wherein
      each of the plurality of determination units is associated with a respective first threshold voltage, and
      each of the plurality of determination units is configured to compare the voltage with the respective first threshold voltage;
   a voltage level converter configured to apply an arbitrary bias to the voltage to offset a level of the voltage, wherein a bias amount of the applied arbitrary bias is based on the comparison;
   a first amplifier configured to amplify the offset voltage; and
   a first measurement section configured to measure a first timing at which the amplified voltage reaches a second threshold voltage.

2. The distance measurement apparatus according to claim 1, wherein the first measurement unit further includes a linear amplifier configured to amplify the output from the first light receiver.

3. The distance measurement apparatus according to claim 1, wherein the first amplifier is further configured to output a specific limit value based on the amplified voltage that exceeds the specific limit value.

4. The distance measurement apparatus according to claim 1, further comprising:
the first light receiver configured to:
   receive light associated with a measurement target; and
   output a current signal based on the received light; and
a converter configured to convert the current signal into the voltage.

5. The distance measurement apparatus according to claim 1, further comprising a calculation unit configured to calculate a distance to a measurement target based on the measured first timing.

6. The distance measurement apparatus according to claim 1, comprising a second measurement unit that includes:
   a second amplifier configured to amplify an output from a second light receiver; and
   a second measurement section configured to measure a second timing at which the amplified output reaches a third threshold voltage.

7. The distance measurement apparatus according to claim 6, wherein
   the first light receiver that receives light reflected by a measurement target, and
   the second light receiver that receives reference light projected from a light projection unit.

8. The distance measurement apparatus according to claim 6, further comprising a light projection unit.

9. The distance measurement apparatus according to claim 6, further comprising a calculation unit configured to calculate a distance to a measurement target based on the first measured timing and the second measured timing.

10. A distance measurement method, comprising:
in a distance measurement apparatus that includes a plurality of determination units, a voltage level converter, an amplifier, and a measurement section:
receiving, by each of the plurality of determination units, a voltage that is associated with an output from a light receiver, wherein each of the plurality of determination units is associated with a respective first threshold voltage;
comparing, by each of the plurality of determination units, the voltage with the respective first threshold voltage;
applying, by the voltage level converter, an arbitrary bias to the voltage to offset a level of the voltage, wherein a bias amount of the applied arbitrary bias is based on the comparison;
amplifying, by the amplifier, the offset voltage; and
measuring, by the measurement section, a timing at which the amplified voltage reaches a second threshold voltage.

* * * * *